(12) United States Patent
Huang

(10) Patent No.: US 8,246,001 B2
(45) Date of Patent: Aug. 21, 2012

(54) PORTABLE ELECTRONIC DEVICE WITH SUPPORTING MEMBER

(75) Inventor: Chao-Jui Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 317 days.

(21) Appl. No.: 12/632,783

(22) Filed: Dec. 7, 2009

(65) Prior Publication Data

US 2011/0042548 A1 Feb. 24, 2011

(30) Foreign Application Priority Data

Aug. 21, 2009 (CN) .......................... 2009 1 0305872

(51) Int. Cl.
*F16M 11/00* (2006.01)
(52) U.S. Cl. ......... 248/688; 248/685; 248/174; 396/428
(58) Field of Classification Search .................. 248/685, 248/686, 688, 461, 116, 174; 396/419, 428
See application file for complete search history.

(56) References Cited

U.S. PATENT DOCUMENTS

| | | | | | |
|---|---|---|---|---|---|
| 2,813,456 | A | * | 11/1957 | Ostrov | ............................. 355/21 |
| 5,732,928 | A | * | 3/1998 | Chang | ........................... 248/688 |
| 6,002,889 | A | * | 12/1999 | Balling et al. | ................ 396/535 |
| 6,488,420 | B1 | * | 12/2002 | Fisher | ........................... 396/419 |
| 7,422,379 | B2 | * | 9/2008 | Agevik et al. | ................. 396/424 |
| 7,681,859 | B2 | * | 3/2010 | Kim | ............................... 248/688 |
| 7,780,126 | B2 | * | 8/2010 | Law et al. | ...................... 248/168 |
| 2002/0036702 | A1 | * | 3/2002 | Ohnogi | ..................... 348/333.05 |
| 2007/0140684 | A1 | * | 6/2007 | Tsang | ........................... 396/419 |
| 2007/0279511 | A1 | * | 12/2007 | Misawa | ................... 348/333.06 |
| 2008/0232792 | A1 | * | 9/2008 | Speggiorin et al. | ........... 396/428 |
| 2009/0321609 | A1 | * | 12/2009 | Wang et al. | ..................... 248/685 |
| 2010/0142130 | A1 | * | 6/2010 | Wang et al. | ............. 361/679.01 |
| 2010/0150543 | A1 | * | 6/2010 | Fong | .............................. 396/428 |
| 2010/0171671 | A1 | * | 7/2010 | Park | ............................... 343/720 |
| 2010/0308202 | A1 | * | 12/2010 | Hu et al. | ........................ 248/685 |
| 2011/0280566 | A1 | * | 11/2011 | Cherubin | ....................... 396/428 |

* cited by examiner

*Primary Examiner* — Bradley Duckworth
(74) *Attorney, Agent, or Firm* — Altis Law Group, Inc.

(57) ABSTRACT

A portable electronic device is disclosed. The portable electronic device includes a main body and a supporting member rotatably connected to the main body. The main body defines a chamber for receiving detachable elements of the portable electronic device therein. The supporting member includes a number of supporting sheets which can be folded or unfolded relatively to each other. The folded supporting member is configured for covering the chamber of the main body, and the unfolded supporting member is configured for supporting the main body.

19 Claims, 5 Drawing Sheets

PORTABLE ELECTRONIC DEVICE WITH SUPPORTING MEMBER

CROSS-REFERENCE TO RELATED APPLICATION

This application is related to, and claims the benefit of, a foreign priority application filed in China as Application No. 200910305872.8 on Aug. 21, 2009. The related application is incorporated herein by reference.

BACKGROUND

1. Technical Field

The present disclosure relates to portable electronic devices with supporting members.

2. Description of Related Art

Many electronic devices include a camera module for capturing images and a display for viewing the images. However, as demand for portability of electronic devices increases, size and profile minimization become more of a priority. Such minimization, however, often presents difficulty in stably placing the device on a surface. A tripod is sometimes deployed accordingly, but it is troublesome to carry the tripod in addition to the device itself.

What is needed, therefore, is a portable electronic device to overcome the described limitations.

BRIEF DESCRIPTION OF THE DRAWINGS

The components of the drawings are not necessarily drawn to scale, the emphasis instead being placed upon clearly illustrating the principles of the embodiments of the portable electronic device. Moreover, in the drawings, like reference numerals designate corresponding parts throughout several views.

DETAILED DESCRIPTION

Figure 1:
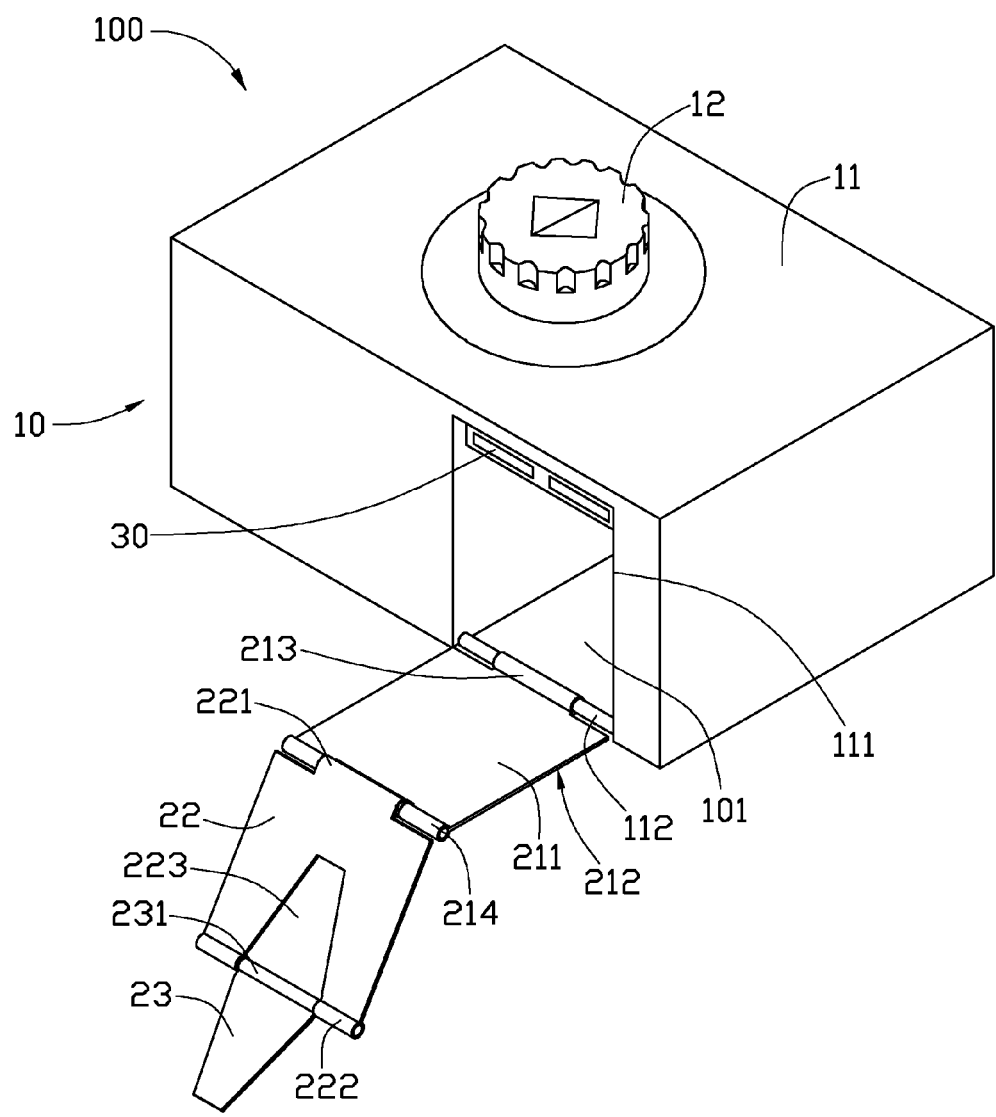
FIG. 1 is an isometric schematic view of a portable electronic device including a supporting member, according to an exemplary embodiment of the present disclosure, showing the supporting member in a first state.
Figure 2:
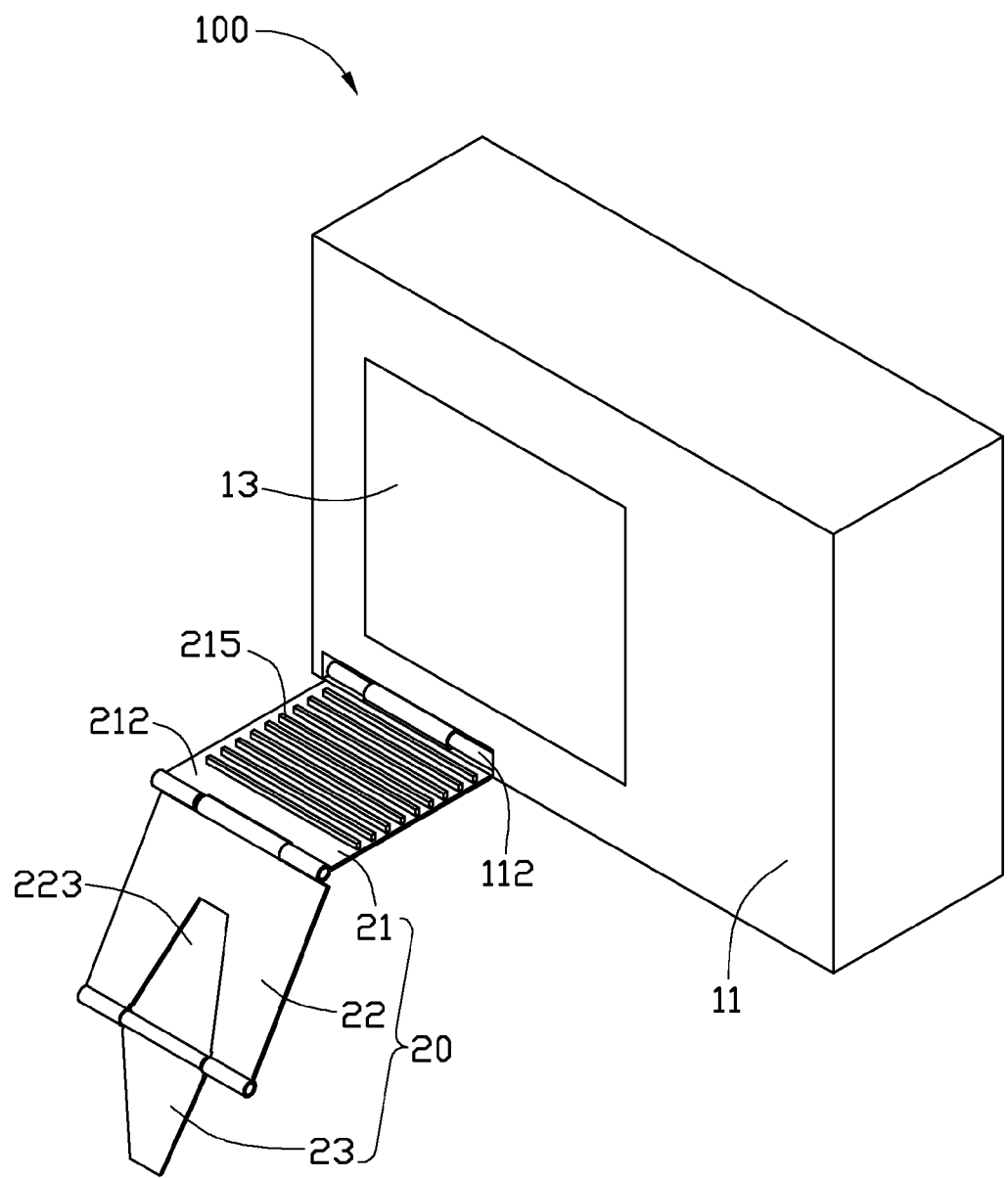
FIG. 2 is similar to FIG. 1, but viewed from another angle showing the supporting member in a second state.

Referring to FIGS. 1-2, a portable electronic device 100, according to an exemplary embodiment, is shown. The portable electronic device 100 includes a main body 10 and a supporting member 20 rotatably connected to the main body 10.

The main body 10 includes a housing 11 configured for receiving a plurality of functional elements (not shown) of the portable electronic device 100. A chamber 101 is defined in the main body 10 for receiving detachable element(s) of the portable electronic device 100 therein, such as batteries. The housing 11 defines an opening 111 communicating with the chamber 101. In this embodiment, the opening 111 is substantially rectangular. The main body 10 includes a first shaft 112 fixed on a side of the opening 111.

The portable electronic device 100 further includes a camera module 12 arranged at a front wall of the housing 11 and a display 13 arranged at a rear wall of the housing 11.

The supporting member 20 includes a first supporting sheet 21, a second supporting sheet 22 rotatably connected to the first supporting sheet 21, and a third supporting sheet 23 rotatably connected to the second supporting sheet 22.

The first supporting sheet 21 is shaped and sized corresponding to the opening 111. The first supporting sheet 21 includes a first sleeve portion 213 and a second shaft 214 fixed at two opposite sides thereof, respectively. The first sleeve portion 213 rotatably sleeves on the first shaft 112. The first supporting sheet 21 includes a first surface 211 and a second surface 212 opposite the first surface 211. A restraining portion 215 is formed on the second surface 212 of the first supporting sheet 21. In this embodiment, the restraining portion 215 comprises a number of bars protruding from the second surface 212 of the first supporting sheet 21. The bars are parallel to each other and to an axis of the first shaft 112. Alternatively, the restraining portion 215 could comprise a number of grooves defined in the second surface 212 of the first supporting sheet 21.

The second supporting sheet 22 includes a second sleeve portion 221 and a third shaft 222 fixed at two opposite sides thereof, respectively. The second sleeve portion 221 rotatably sleeves on the second shaft 214. The second supporting sheet 22 has a receiving through hole 223 defined therein. The receiving through hole 223 is configured for receiving the third supporting sheet 23.

The third supporting sheet 23 includes a third sleeve portion 231 at a side thereof. The third sleeve portion 231 rotatably sleeves on the third shaft 222. The third supporting sheet 23 is shaped and sized corresponding to the receiving through hole 223. In this embodiment, the receiving through hole 223 and the third supporting sheet 23 are trapezoidal. In other alternative embodiments, the receiving through hole 223 and the third supporting sheet 23 can be other shapes such as rectangular or triangular.

Figure 3:
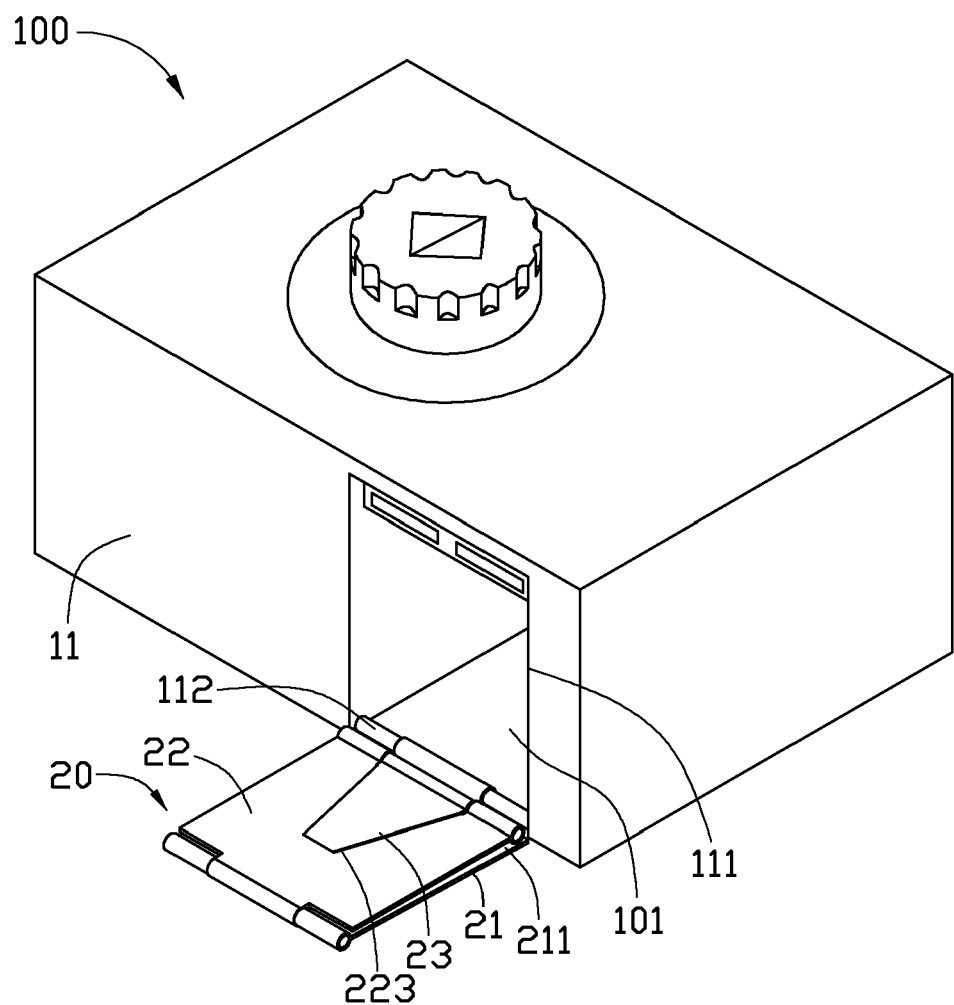
FIG. 3 is similar to FIG. 1, but shows the supporting member in a third state.

Referring to FIG. 3, when the second supporting sheet 22 is rotated to abut the first surface 211 of the first supporting sheet 21, the third supporting sheet 23 is rotated into the receiving through hole 223, and the first supporting sheet 21, the second supporting sheet 22 and the third supporting sheet 23 are folded to form a cover for the chamber 101, such as a battery cover. In this configuration, the supporting member 20 can rotate about the first shaft 112 to cover the chamber 101. A connecting member 30 is set on a side of the opening 111 opposite to the first shaft 112 for connecting the supporting member 20 to the main body 10.

Figure 4:
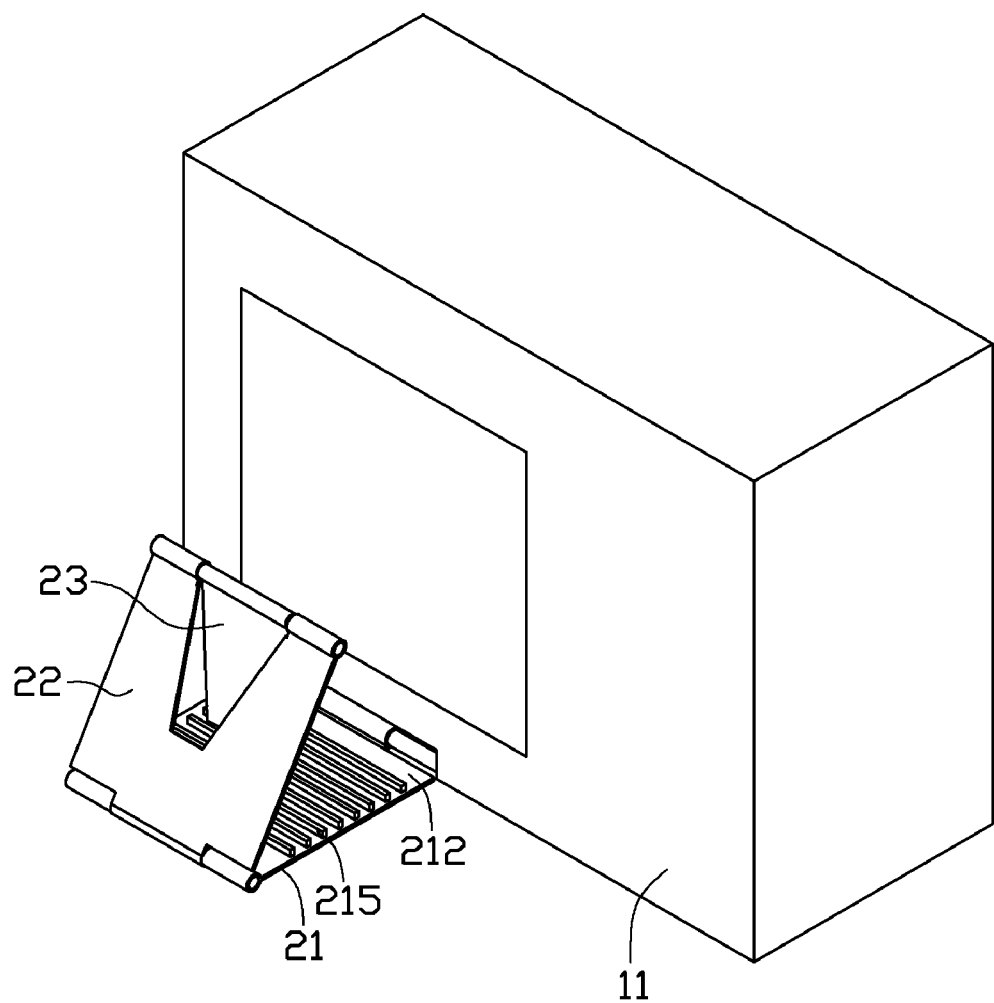
FIG. 4 is similar to FIG. 2, but shows the supporting member in a fourth state.
Figure 5:
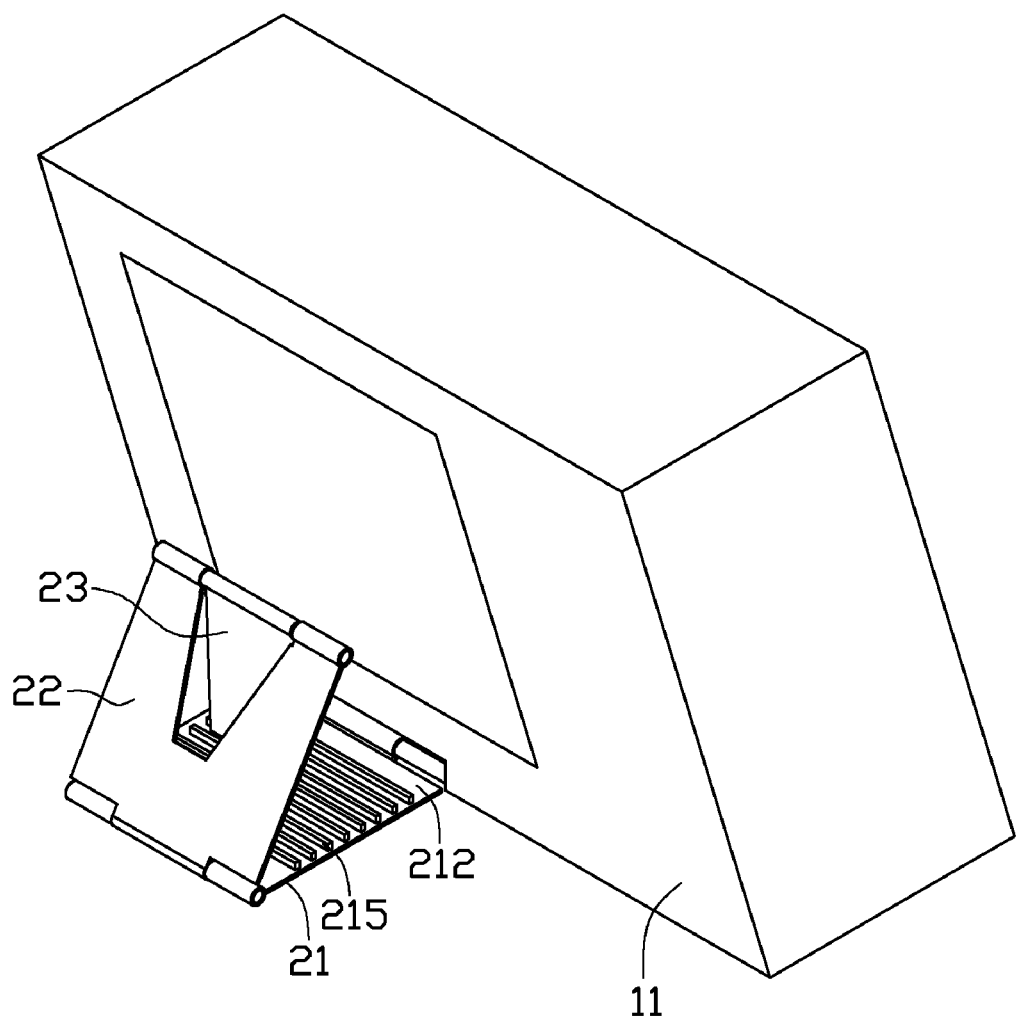
FIG. 5 is similar to FIG. 4, but shows main body supported by the supporting member.

Referring to FIG. 4 and FIG. 5, the supporting member 20 also can serve as a support for the main body 10. The first supporting sheet 21 is rotated about the first shaft to release from the main body 10. The second supporting sheet 22 is rotated to face the second surface 212 of the first supporting sheet 21. Then, the third supporting sheet 23 is rotated out of the receiving through hole 223 of the second supporting sheet 22. A distal end of the third supporting sheet 23 is positioned between two adjacent bars of the restraining portion 215. Therefore, in this configuration, the supporting member 20 serves as the supporter for the main body 10. The main body 10 is rotated about the first shaft 112 to abut the third supporting sheet 23 of the supporting member 20. The distal end of the third supporting sheet 23 can be restrained between the two adjacent bars of the restraining portion 215. Thus, by positioning the distal end of the third supporting sheet 23 between other two adjacent bars of the restraining portion 215, the main body 10 is supported by the supporting member with different view angles.

The supporting member 20 can serve not only as a cover of the portable electronic device 100, but also can serve as a supporter of the portable electronic device 100. Furthermore, the portable electronic device 100 with the supporting member 20 keeps compact. Thus it is convenient for carrying.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device, comprising:
a main body defining a chamber for receiving detachable element(s) of the portable electronic device therein; and
a supporting member rotatably connected to the main body, the supporting member comprising a plurality of supporting sheets that are capable of being folded or unfolded relatively to each other,
wherein, the plurality of supporting sheets comprise a first supporting sheet, a second supporting sheet rotatably connected to the first supporting sheet, and a third supporting sheet rotatably connected to the second supporting sheet, and the second supporting sheet defines a receiving through hole for receiving the third supporting sheet therein, and
the folded supporting member is configured for covering the chamber of the main body, and the unfolded supporting member is configured for supporting the main body.

2. The portable electronic device of claim 1, wherein the main body comprises a housing configured for receiving a plurality of functional elements of the portable electronic device, and the housing defines an opening communicating with the chamber.

3. The portable electronic device of claim 2, wherein the opening is substantially rectangular, and the main body comprises a first shaft fixed on a side of the opening for connecting to the supporting member.

4. The portable electronic device of claim 3, wherein the first supporting sheet comprises a first sleeve portion and a second shaft fixed at two opposite sides thereof, and the first sleeve portion is rotatably sleeved on the first shaft.

5. The portable electronic device of claim 4, wherein the second supporting sheet comprises a second sleeve portion and a third shaft fixed at two opposite sides thereof, and the second sleeve portion is rotatably sleeved on the second shaft.

6. The portable electronic device of claim 5, wherein the third supporting sheet comprises a second sleeve portion at a side thereof, and the third sleeve portion is rotatably sleeved on the third shaft.

7. The portable electronic device of claim 1, wherein the first supporting sheet comprises a first surface, a second surface opposite the first surface, and a restraining portion formed on the second surface.

8. The portable electronic device of claim 7, wherein the restraining portion comprises a plurality of parallel bars protruding from the second surface of the first supporting sheet.

9. The portable electronic device of claim 7, wherein the restraining portion comprises a plurality of parallel grooves defined in the second surface of the first supporting sheet.

10. The portable electronic device of claim 2, wherein the main body comprises a camera module arranged at a front wall of the housing and a display arranged at a rear wall of the housing.

11. A portable electronic device, comprising:
a main body defining a chamber for receiving detachable element(s) of the portable electronic device therein; and
a supporting member rotatably connected to the main body, the supporting member comprising a plurality of supporting sheets that are capable of being folded or unfolded relatively to each other;
wherein, the plurality of supporting sheets comprise a first supporting sheet, a second supporting sheet rotatably connected to the first supporting sheet, and a third supporting sheet rotatably connected to the second supporting sheet;
the main body comprises a housing and a first shaft, the housing is configured for receiving a plurality of functional elements of the portable electronic device and defines an opening communicating with the chamber, and the first shaft is fixed on a side of the opening for connecting to the supporting member;
the first supporting sheet comprises a first sleeve portion and a second shaft fixed at two opposite sides thereof, and the first sleeve portion is rotatably sleeved on the first shaft; and
the folded supporting member is configured for covering the chamber of the main body, and the unfolded supporting member is configured for supporting the main body.

12. A portable electronic device comprising:
a main body defining a chamber for receiving a battery of the portable electronic device therein, wherein the main body comprises a housing configured to receive a plurality of functional elements of the portable electronic device, the housing defines an opening communicating with the chamber, and a first shaft is fixed to a side of the opening; and
a supporting member rotatably connected to the main body, the supporting member comprising a plurality of supporting sheets that are capable of being folded or unfolded relatively to each other,
wherein the folded supporting member functions as a battery cover to cover the chamber of the main body, the unfolded supporting member is configured for supporting the main body.

13. The portable electronic device of claim 12, wherein the plurality of supporting sheets comprise a first supporting sheet, a second supporting sheet and a third supporting sheet, the second supporting sheet is connected to the first supporting sheet and is capable of rotating relative to the first supporting sheet, and the third supporting sheet is connected to the second supporting sheet and is capable of rotating relative to the second supporting sheet.

14. The portable electronic device of claim 13, wherein the first supporting sheet comprises a first sleeve portion and a second shaft fixed at two opposite sides thereof, and the first sleeve portion is rotatably sleeved on the first shaft; the second supporting sheet comprises a second sleeve portion and a third shaft fixed at two opposite sides thereof, and the second sleeve portion is rotatably sleeved on the second shaft; and the third supporting sheet comprises a third sleeve portion at a side thereof, and the third sleeve portion is rotatably sleeved on the third shaft.

15. The portable electronic device of claim 13, wherein the first supporting sheet comprises a first surface and a second surface opposite to the first surface, and a restraining portion formed on the second surface.

16. The portable electronic device of claim 15, wherein the restraining portion comprises a plurality of parallel bars protruding from the second surface of the first supporting sheet, and a distal end of the third supporting sheet is capable of being disposed between two adjacent bars of the restraining portion.

17. The portable electronic device of claim 15, wherein the restraining portion comprises a plurality of parallel grooves defined in the second surface of the first supporting sheet.

18. The portable electronic device of claim 13, wherein the second supporting sheet defines a receiving through hole for receiving the third supporting sheet therein.

19. The portable electronic device of claim 12, wherein a connecting member is provided on a side of the opening opposite to the first shaft for connecting the folded supporting sheets to the main body.

\* \* \* \* \*